United States Patent [19]
Liang

[11] Patent Number: 6,155,107
[45] Date of Patent: Dec. 5, 2000

[54] ENGINE OIL LEVEL DETECTOR FOR A VEHICLE

[76] Inventor: Chung-Ho Liang, 2/F., No. 66, Sec. 3, Cheng-Tai Rd., Wu-Ku Village, Taipei County, Taiwan

[21] Appl. No.: 09/301,760

[22] Filed: Apr. 29, 1999

[51] Int. Cl.[7] ................................................. G01M 15/00
[52] U.S. Cl. ......................... 73/118.1; 73/290 R; 137/386
[58] Field of Search ..................... 73/49.7, 113, 118.1, 73/290 R, 301, 302, 303, 305, 306, 307, 308, 323, 290 B, 312; 184/1.5, 108; 137/393, 386

[56] References Cited

U.S. PATENT DOCUMENTS

| | | | |
|---|---|---|---|
| 3,846,747 | 11/1974 | Arai et al. | |
| 4,035,789 | 7/1977 | Akita et al | 73/290 V |
| 4,107,984 | 8/1978 | Unger et al. | 73/113 |
| 4,135,186 | 1/1979 | Minorikawa et al. | 73/295 |
| 4,203,408 | 5/1980 | Yamaguchi et al. | 73/301 |
| 4,476,714 | 10/1984 | Barry et al. | 73/118.1 |
| 4,583,085 | 4/1986 | Beller | 73/290 R |
| 4,640,126 | 2/1987 | Jansch | 73/290 R |
| 4,649,746 | 3/1987 | Snow | 73/290 R |
| 4,739,301 | 4/1988 | Steffenhagen | 73/290 R |
| 4,754,732 | 7/1988 | Kuczenski et al. | 73/290 R |
| 4,762,000 | 8/1988 | Bond Jr. | 73/290 R |
| 4,777,821 | 10/1988 | Gerve | 73/290 R |
| 5,021,665 | 6/1991 | Ames . | |
| 5,555,857 | 9/1996 | Kanno | 73/290 R |
| 5,680,791 | 10/1997 | Joynt | 73/290 R |
| 5,808,187 | 9/1998 | Gooden et al. | 73/118.1 |
| 5,831,154 | 11/1998 | Guertler et al. | 73/302 |
| 5,872,509 | 2/1999 | Kim | 73/308 |
| 6,053,706 | 4/2000 | Allen . | |

*Primary Examiner*—Eric S. McCall
*Attorney, Agent, or Firm*—Rosenberg, Klein & Lee

[57] ABSTRACT

An engine oil level detector, which includes a casing, a cover covered on the casing and defining two communicated air chambers, a diaphragm covered on the air chambers of the cover, the diaphragm having first and second tubular coupling portions, an electromagnetic valve mounted in the casing and controlled to reciprocate the first tubular coupling portion, a solenoid switch controlling a signal lamp, a magnet moved with the second tubular coupling portion to turn on/off the solenoid switch, and a suction tube connected between the first air chamber and the engine oil tank in a vehicle engine, wherein the magnet is moved with the second tubular coupling portion of the diaphragm toward the solenoid switch, causing the solenoid switch to be turned off when the oil level in the engine oil tank drops below the suction tube and the electromagnetic valve is turned on; the magnet is moved with the tubular coupling portion of the diaphragm away from the solenoid switch, causing the solenoid switch to be turned on when the oil level in the engine oil tank surpasses the suction tube and the electromagnetic valve is turned on.

6 Claims, 5 Drawing Sheets

ENGINE OIL LEVEL DETECTOR FOR A VEHICLE

BACKGROUND OF THE INVENTION

The present invention relates to an engine oil level detector for detecting the engine oil level in an engine.

In conventional engine oil level detectors, a float or sensor means is used and dipped in the engine oil inside the engine to detect its level. Because the float or sensor means is directly installed inside the engine, it is frequently heated. Therefore, an engine oil level detector of this design is not durable in use. When the float or sensor means is damaged, correct indication cannot be shown at the indicator means.

SUMMARY OF THE INVENTION

The present invention has been accomplished to provide an engine oil level detector which eliminates the aforesaid problem. It is one object of the present invention to provide an engine oil level detector which is safe and durable in use. It is another object of the present invention to provide an engine oil level detector which enables to user to check the engine oil level when desired. According to one aspect of the present invention, the engine oil level detector comprises a casing, a cover covered on the casing and defining two communicated air chambers, a diaphragm covered on the air chambers of the cover, the diaphragm having first and second tubular coupling portions, an electromagnetic valve mounted in the casing and controlled to reciprocate the first tubular coupling portion, a solenoid switch controlling a signal lamp, a magnet moved with the second tubular coupling portion to turn on/off the solenoid switch, and a suction tube connected between the first air chamber and the engine oil tank in a vehicle engine, wherein the magnet is moved with the second tubular coupling portion of the diaphragm toward the solenoid switch, causing the solenoid switch to be turned off when the oil level in the engine oil tank drops below the suction tube and the electromagnetic valve is turned on; the magnet is moved with the tubular coupling portion of the diaphragm away from the solenoid switch, causing the solenoid switch to be turned on when the oil level in the engine oil tank surpasses the suction tube and the electromagnetic valve is turned on. According to another aspect of the present invention, a test switch is provided for controlling the electromagnetic valve, so that the user can check the engine oil level when desired.

DETAILED DESCRIPTION OF THE PREFERRED EMBODIMENT

Figure 1:
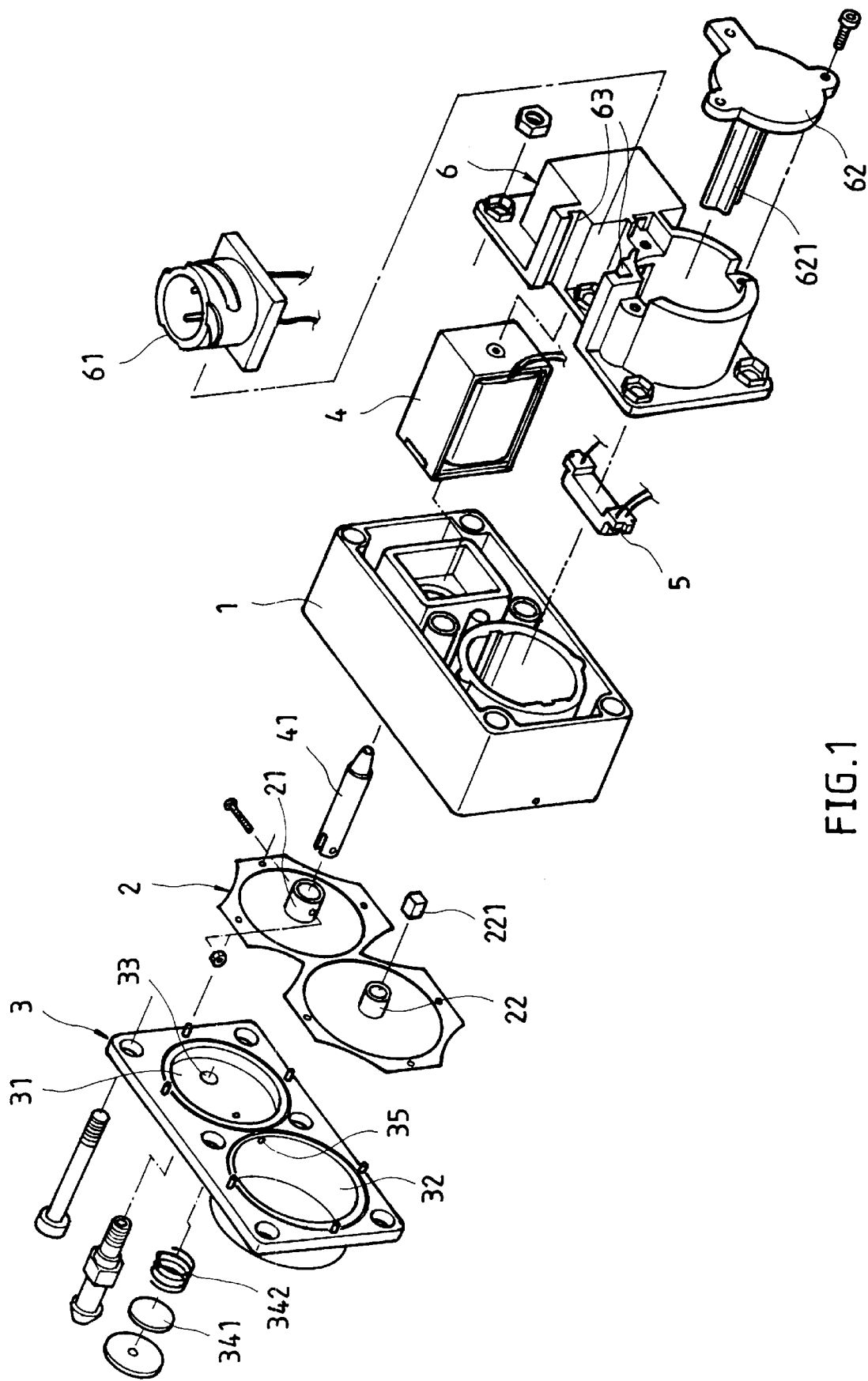
FIG. 1 is an exploded view of an engine oil level detector for a vehicle according to the present invention.
Figure 2:
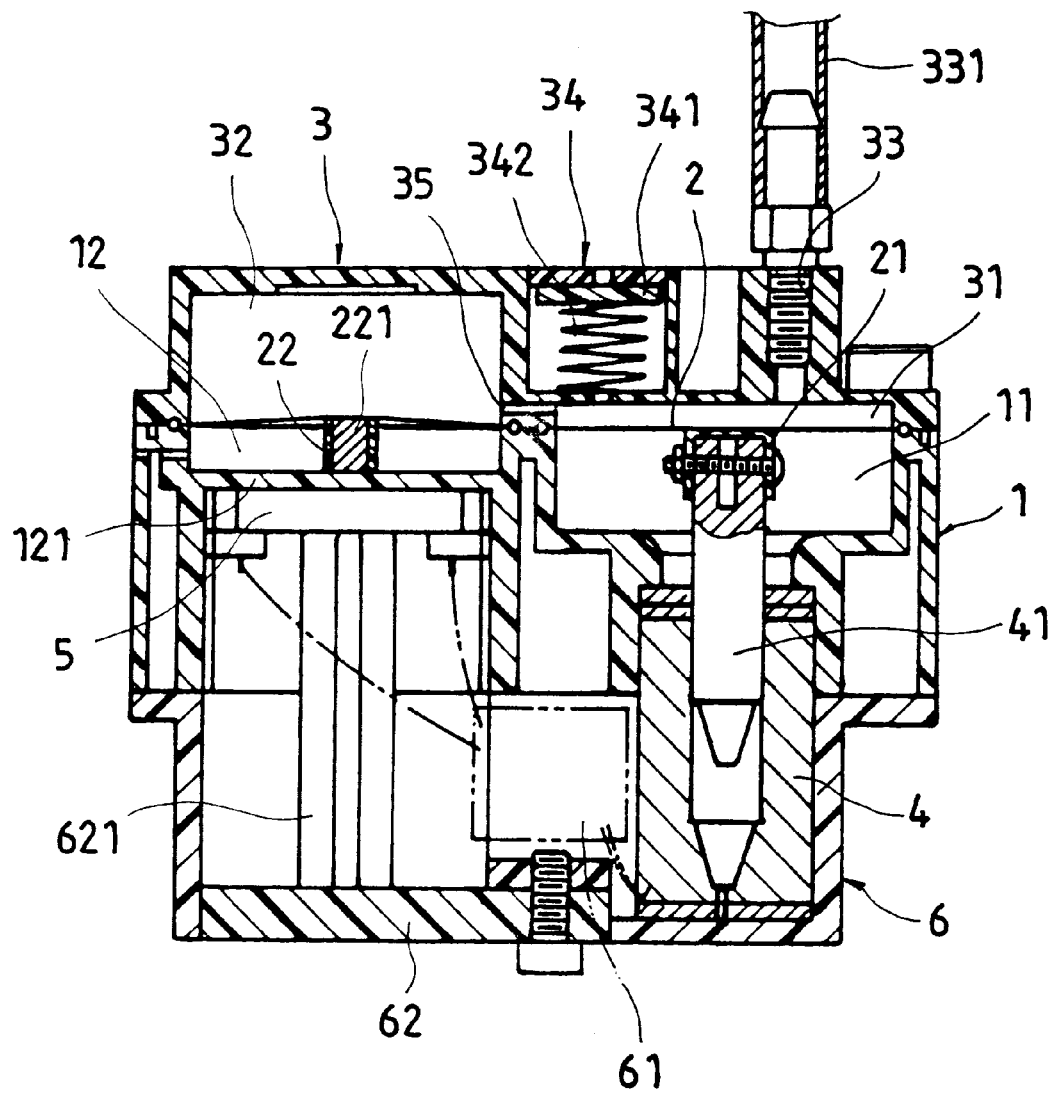
FIG. 2 is a sectional assembly view of the present invention.
Figure 3:
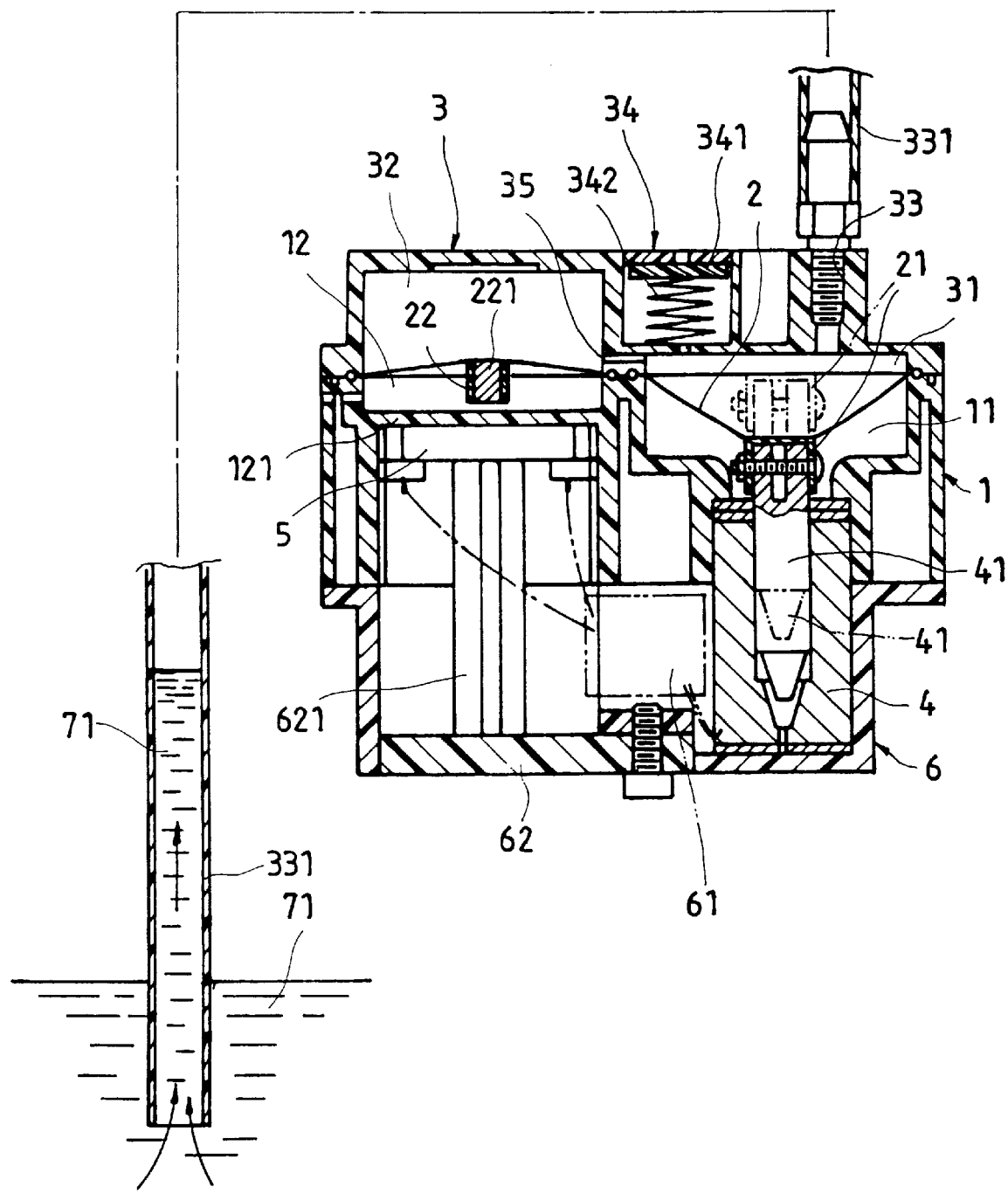
FIG. 3 shows the status of the engine oil level detector when engine oil level normal.
Figure 4:
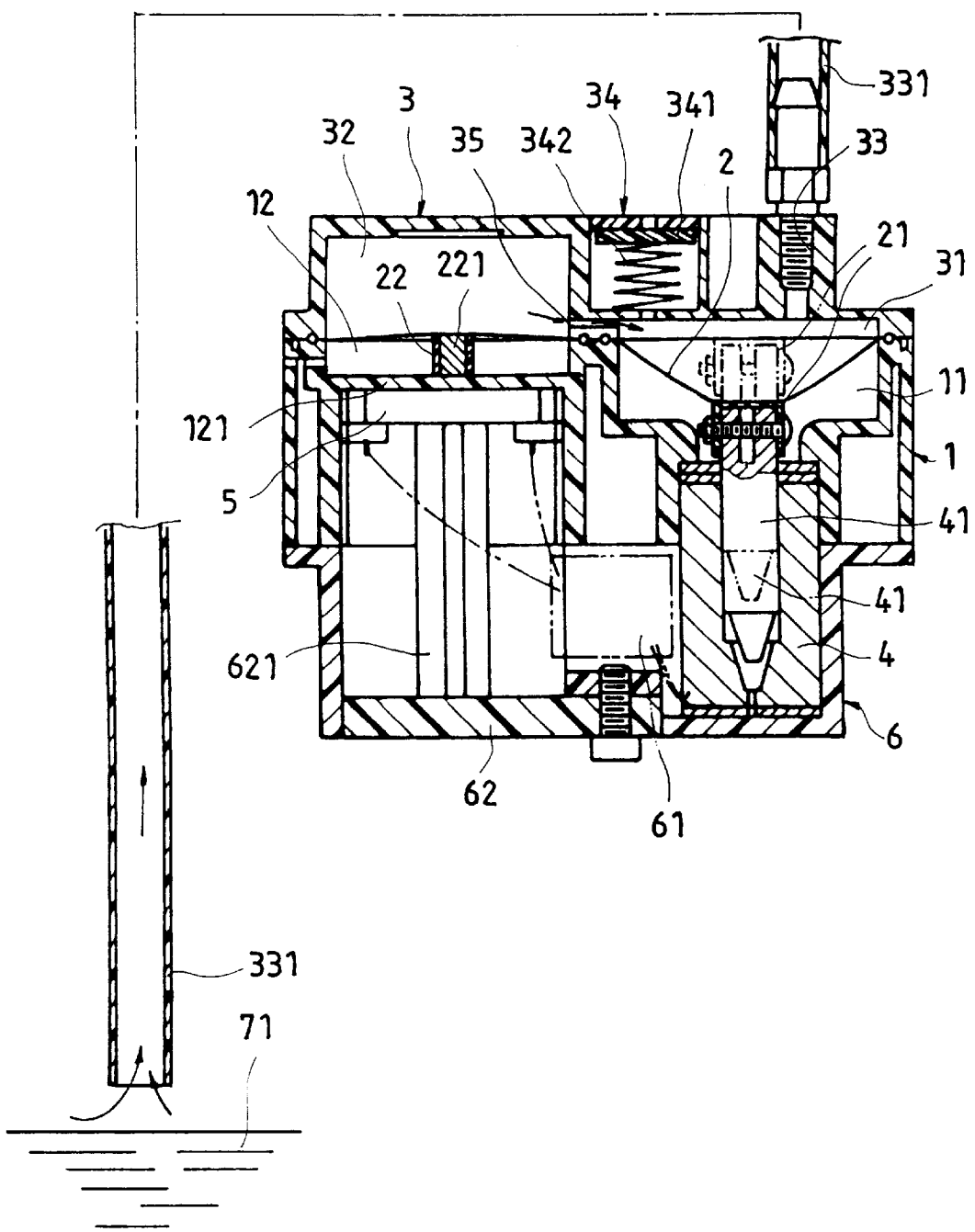
FIG. 4 shows the status of the engine oil level detector when engine oil dropped below the suction tube.
Figure 5:
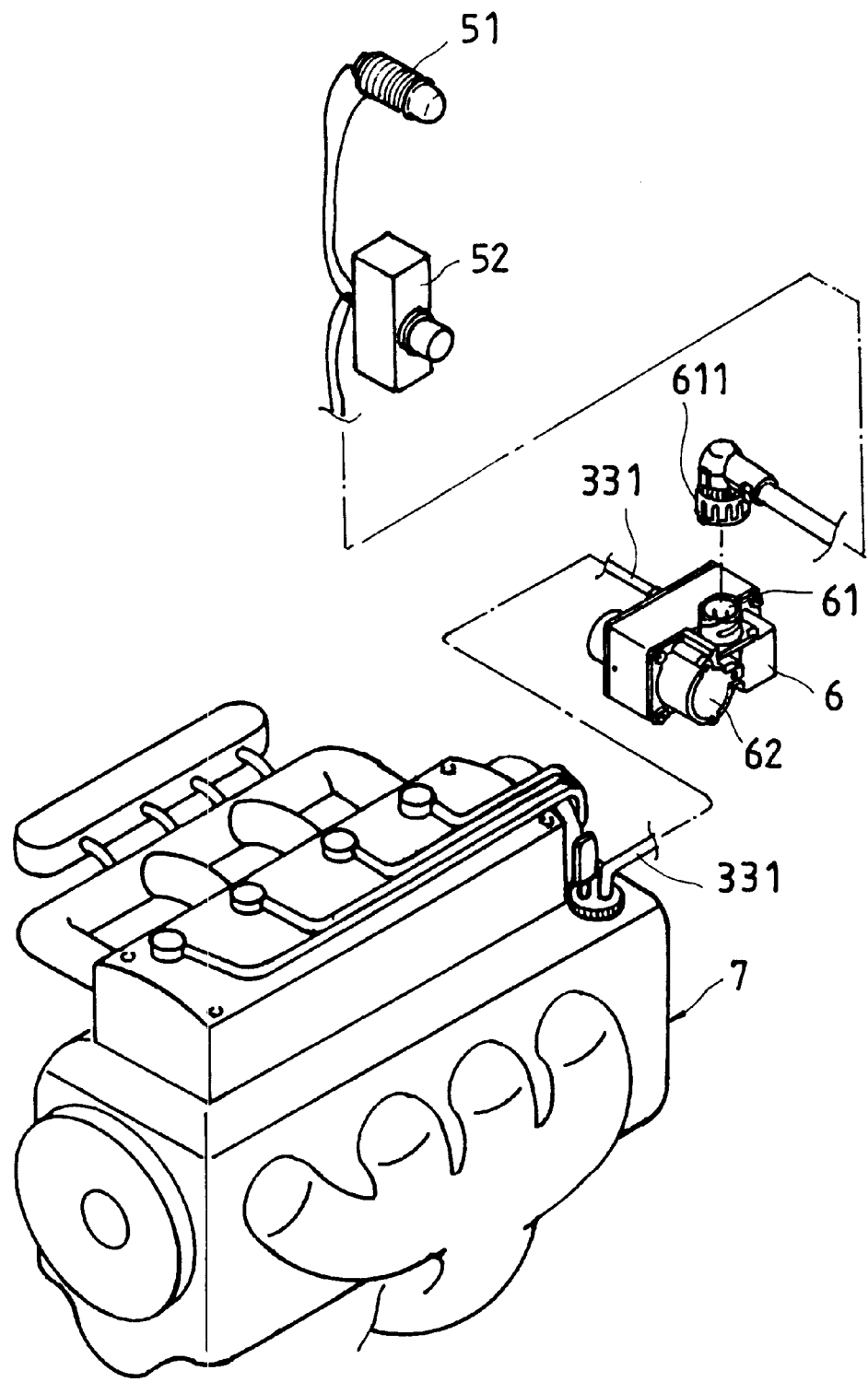
FIG. 5 shows the installation of the present invention in a vehicle engine.

Referring to FIGS. from 1 through 5, a top cover 3 which defines a first air chamber 31 and a second air chamber 32 is top covered on one side, namely, the top side of a casing 1. A through hole 35 is provided between the first air chamber 31 and the second air chamber 32. A silicon rubber diaphragm 2 is retained between the top cover 3 and the casing 1 to seal the air chambers 31 and 32, having a first tubular coupling portion 21 in communication with the first air chamber 31 and a second tubular coupling portion 22 in communication with the second air chamber 32. An electromagnetic valve 4 is mounted in a chamber 11 at the casing 1, having a reciprocating rod 41 connected to the first tubular coupling portion 21 of the silicon rubber diaphragm 2. A suction tube 331 is provided having one end connected to a through hole 33 at the first air chamber 31 and an opposite end dipped in the engine oil 71 inside a vehicle engine 7 (see FIGS. 3 and 5). A solenoid switch 5 is fastened to a partition wall 121 in a chamber 12 inside the casing 1 to control a signal lamp 51. A magnet 221 is fastened to the second tubular coupling portion 22 of the silicon rubber diaphragm 2, and disposed in contact with the partition wall 121 at one side opposite to the solenoid switch 5. When the oil level of the engine oil 71 surpasses the suction tube 331, a test switch 52 is pressed on to energize the electromagnetic valve 4, causing the reciprocating rod 41 to be attracted and the silicon rubber diaphragm 2 to be pulled by the reciprocating rod 41 toward the electromagnetic valve 4, therefore a suction force is induced at the suction tube 331 to suck the engine oil 71 into the suction tube 331. At the same time, air in the suction tube 331 and the second air chamber 32 is drawn into the first air chamber 31, causing the inside pressure of the first air chamber 31 to be increased, and therefore the magnet 221 is moved with the second tubular coupling portion 22 of the silicon rubber diaphragm 2 away from the partition wall 121 of the casing 1, enabling the solenoid switch 5 to be switched on, and therefore the signal light 51 is turned on. If the suction force surpasses the spring power of the spring 342 of an one-way valve 34 in the top cover 3, the valve flap 341 of the one-way valve 34 is pushed inwards by outside air, enabling outside air to pass into the first air chamber 31 and the second air chamber 32, and therefore the inside pressure is balanced. On the contrary, if the oil level of the engine oil 71 drops below the suction tube 331, air passes through the suction tube 331 into the first air chamber 31 and the second air chamber 32, the silicon rubber diaphragm 2 is maintained balanced, and the magnet 221 is returned to its former position in contact with the partition wall 121, and therefore the solenoid switch 5 is off, and the signal lamp 51 is off.

Further, a bottom cover 6 is covered on one side, namely, the bottom side of the casing 1. The bottom cover 6 comprises a track 63. A receptacle 61 is fastened to the track 63 to receive an electric plug 611. A cap 62 is fastened to the bottom cover 6 to lock the receptacle 61. The cap 62 has a stop rod 621 perpendicularly raised from its back side, and stopped against the solenoid switch 5.

What the invention claimed is:

1. An engine oil level detector comprising:

a casing having a first receiving chamber and a second receiving chamber;

a top cover covered on said casing at one side, said top cover comprising a first air chamber, a second air chamber, and an air hole in communication between said first air chamber and said second air chamber;

a diaphragm covered on said first air chamber and said second air chamber, said diaphragm comprising a first tubular coupling portion in communication with said first air chamber and a second tubular coupling portion in communication with said second air chamber;

a suction tube having one end connected to the first air chamber of said casing and an opposite end inserted an engine oil tank in a vehicle engine;

a test switch an electromagnetic valve mounted in the first receiving chamber inside said casing and controlled by said test switch, said electromagnetic valve comprising a reciprocating rod fastened to the first tubular coupling portion of said diaphragm;

a solenoid switch mounted in the second receiving chamber inside said casing corresponding to the second tubular coupling portion of said diaphragm;

a signal lamp controlled by said solenoid switch;

a magnet fastened to the second tubular coupling portion of said diaphragm; and a bottom cover covered on said casing at one side opposite to said top cover to close said first receiving chamber and said second receiving chamber;

wherein when the oil level in said engine oil tank surpasses said suction tube and said test switch is switched on, said reciprocating rod is attracted by said electromagnetic valve to pull said first tubular coupling portion of said diaphragm toward said electromagnetic valve, enabling air to be sucked from said second air chamber into said first air chamber and said magnet to be moved with said second tubular coupling portion of said diaphragm in direction reversed to said solenoid switch, thereby causing said solenoid switch to cut off said signal lamp; when the oil level in said engine oil tank drops below said suction tube and said test switch is switched on, said reciprocating rod is released, and said diaphragm returns to a balanced manner, thereby causing said magnet to be moved with said second tubular coupling portion in direction toward said solenoid switch, to turn off said solenoid switch and said signal lamp.

2. The engine oil level detector of claim 1 further comprising an one-way valve mounted in said top cover for letting outside air flowing into said first air chamber when the suction force in said first air chamber surpasses a predetermined level.

3. The engine oil level detector of claim 1 further comprising an electric receptacle mounted on said bottom cover.

4. The engine oil level detector of claim 3 wherein said bottom cover comprises a track, which holds said electric receptacle.

5. The engine oil level detector of claim 4 further comprising a cap fastened to said bottom cover to fix said electric receptacle in place.

6. The engine oil level detector of claim 5 wherein said cap comprises a stop rod pressed on said solenoid switch to hold down said solenoid switch.

* * * * *